(12) United States Patent
Susaki et al.

(10) Patent No.: US 7,337,283 B2
(45) Date of Patent: Feb. 26, 2008

(54) METHOD AND SYSTEM FOR MANAGING STORAGE RESERVATION

(75) Inventors: Tomoko Susaki, Yokohama (JP); Takeshi Arisaka, Kawasaki (JP); Takeshi Saito, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 397 days.

(21) Appl. No.: 10/981,672

(22) Filed: Nov. 5, 2004

(65) Prior Publication Data

US 2006/0075198 A1 Apr. 6, 2006

(30) Foreign Application Priority Data

Oct. 4, 2004 (JP) .............................. 2004-290889

(51) Int. Cl.
*G06F 12/14* (2006.01)
*G06F 11/00* (2006.01)

(52) U.S. Cl. .............................. 711/154; 714/5; 714/6
(58) Field of Classification Search ...................... None
See application file for complete search history.

(56) References Cited

U.S. PATENT DOCUMENTS 7,146,522 B1 * 12/2006 Rowe et al. ................... 714/6

2003/0110263 A1 * 6/2003 Shillo .......................... 709/226
2005/0193231 A1 * 9/2005 Scheuren ...................... 714/5

FOREIGN PATENT DOCUMENTS

JP 2004-164165 6/2004

\* cited by examiner

*Primary Examiner*—Gary Portka
*Assistant Examiner*—Duc T. Doan
(74) *Attorney, Agent, or Firm*—Mattingly, Stanger, Malur & Brundidge, P.C.

(57) ABSTRACT

A user operates an input device to set information necessary for reserving a volume and a port while looking at a screen for reservation management displayed on a display device Next, a storage management program retrieves reservable volumes and ports using a volume retrieval subprogram of a policy basis. At this point, when a policy concerning performance is inputted, the storage management program inquires of a performance analysis program of a storage performance management server whether the performance is satisfied. When the volume and the port are found, the storage management program stores reservation information in a reservation management DB using a reservation subprogram. When the volume and the port are not found, the storage management program judges whether an alternative volume for the reserved volume is present using a volume adjustment subprogram.

10 Claims, 20 Drawing Sheets

2100 VOLUME RESERVATION MANAGEMENT TABLE

| RESERVATION ID (2101) | VOLUME ID (2102) | PERIOD OF USE (2103) | PORT NUMBER (2104) | RELIABILITY POLICY (2105) | PERFORMANCE POLICY (2106) | SECURITY POLICY (2107) | STATE (2108) | SECURITY GROUP NUMBER (2109) | HOST NAME (2110) |
|---|---|---|---|---|---|---|---|---|---|
| 1 | ID1, ID3 | 2004. 1.3- 2004. 3.21 | 1, 3 | HIGH | MEDIUM | ON | ALLOCATED | 1 | |
| 2 | ID2 | 2004. 4.3- 2004. 6.21 | 2 | LOW | LOW | OFF | RESERVED | | FIRST HOST |

FIG. 2

1100 VOLUME MANAGEMENT TABLE

| VOLUME ID (1101) | STATE (1102) | RAID LEVEL (1103) | DISK TYPE (1104) | CAPACITY (1105) |
|---|---|---|---|---|
| ID1 | ALLOCATED | RAID5 | FC | 30GB |
| ID2 | NOT ALLOCATED | RAID1+0 | FC | 50GB |

FIG. 3

1200 PORT MANAGEMENT TABLE

| PORT NUMBER (1201) | STATE (1202) | SECURITY (1203) |
|---|---|---|
| 1 | USED | ON |
| 2 | UNUSED | OFF |

FIG. 4

1300 PATH MANAGEMENT TABLE

| PORT NUMBER (1301) | VOLUME ID (1302) | SECURITY GROUP NUMBER (1303) |
|---|---|---|
| 1 | ID1 | 1 |
| 2 | ID2 | 2 |

FIG. 5

1400 SECURITY GROUP MANAGEMENT TABLE

| SECURITY GROUP NUMBER (1401) | HOST NAME (1402) |
|---|---|
| 1 | FIRST HOST, SECOND HOST |
| 2 | FIRST HOST, SECOND HOST, THIRD HOST |

FIG. 6

2100 VOLUME RESERVATION MANAGEMENT TABLE

| RESERVATION ID (2101) | VOLUME ID (2102) | PERIOD OF USE (2103) | PORT NUMBER (2104) | RELIABILITY POLICY (2105) | PERFORMANCE POLICY (2106) | SECURITY POLICY (2107) | STATE (2108) | SECURITY GROUP NUMBER (2109) | HOST NAME (2110) |
|---|---|---|---|---|---|---|---|---|---|
| 1 | ID1, ID3 | 2004.1.3-2004.3.21 | 1, 3 | HIGH | MEDIUM | ON | ALLOCATED | 1 | |
| 2 | ID2 | 2004.4.3-2004.6.21 | 2 | LOW | LOW | OFF | RESERVED | | FIRST HOST |

FIG. 7

2200 POLICY DEFINITION TABLE

| POLICY TYPE | LEVEL | ATTRIBUTE | ATTRIBUTE VALUE |
|---|---|---|---|
| RELIABILITY | HIGH | RAID LEVEL | RAID0+1 OR RAID1 |
| RELIABILITY | HIGH | DISK TYPE | FC |
| RELIABILITY | HIGH | REDUNDANT PATH | 3 |
| RELIABILITY | MEDIUM | RAID LEVEL | RAID6 OR RAID5 |
| RELIABILITY | MEDIUM | DISK TYPE | FC |
| RELIABILITY | MEDIUM | REDUNDANT PATH | 2 |
| RELIABILITY | LOW | RAID LEVEL | RAID0 |
| RELIABILITY | LOW | DISK TYPE | AT |
| RELIABILITY | LOW | REDUNDANT PATH | 1 |
| PERFORMANCE | HIGH | HDD PERFORMANCE | RAID0 OR RAID0+1 |
| PERFORMANCE | HIGH | CPU USE RATE | LESS THAN 50% |
| PERFORMANCE | MEDIUM | HDD PERFORMANCE | RAID0 OR RAID0+1 OR RAID5 OR RAID6 OR RAID1 |
| PERFORMANCE | MEDIUM | CPU USE RATE | LESS THAN 70% |
| PERFORMANCE | LOW | HDD PERFORMANCE | RAID0 OR RAID0+1 OR RAID5 OR RAID6 OR RAID1 |
| PERFORMANCE | LOW | CPU USE RATE | NO LIMITATION |

2300 PRELIMINARILY RESERVABLE VOLUME RESERVATION MANAGEMENT TABLE

| RESERVATION ID 2101 | RESERVATION FLAG 2301 | VOLUME ID 2102 | CAPACITY 2302 | PERIOD OF USE 2103 | PORT NUMBER 2104 | NUMBER OF PORTS 2303 | RELIABILITY POLICY 2105 | PERFORMANCE POLICY 2106 | SECURITY POLICY 2107 | STATE 2108 | SECURITY GROUP NUMBER 2109 | HOST NAME 2110 |
|---|---|---|---|---|---|---|---|---|---|---|---|---|
| 1 | PRELIMINARY RESERVATION | ID1, ID3 | 20GB | 2004.1.3-2004.3.21 | 1,3 | 3 | HIGH | MEDIUM | ON | ALLOCATED | 1 | |
| 2 | | ID2 | 30GB | 2004.4.3-2004.6.21 | 2 | 1 | LOW | LOW | OFF | RESERVED | | FIRST HOST |

METHOD AND SYSTEM FOR MANAGING STORAGE RESERVATION

CROSS-REFERENCES TO RELATED APPLICATIONS

This application relates to and claims priority from Japanese Patent Application No. 2004-290889, filed on Oct. 4, 2004, the entire disclosure of which is incorporated herein by reference.

BACKGROUND OF THE INVENTION

1. Field of the Invention

The present invention relates to a technique for managing allocation of storage apparatuses.

2. Description of the Related Art

For example, JP-A-2004-164165 discloses a technique for, in a computer system in which computers using different volume management methods and access interfaces to storages share the storages, managing allocation of volumes, for example, collectively managing volume usages from both the computers and managing a relation of volume sharing by the computers.

Conventionally, as a technique for managing a network in which storage apparatuses and computer units are mutually connected, the technique only manages whether a volume and a path are 'allocated' or 'not allocated'. Therefore, even if it is known in advance that there is a plan to use a volume and a path, it is impossible to reserve a volume and a path in advance. For example, there is a problem in that, even if reservation for a volume is made possible using a schedule system an available port cannot be found and a path cannot be reserved when a storage is used.

SUMMARY OF THE INVENTION

It is an object of the invention to make it possible to reserve a volume and a path in advance more surely by managing volumes and paths, for which plans of use are known in advance, as reserved volumes and reserved ports in advance and to support a storage apparatus extension project in future.

In order to solve the problem, in a method and a system for managing storage reservation according to the invention, a reservation for use of a storage from a user is inputted, it is judged whether a volume and a port of the storage according to the input can be reserved, if the volume and the port can be reserved, a reservation for the volume and the port is recorded in a recording unit, and if the volume and the port cannot be reserved, volumes are adjusted and reservation possibility is judged. To explain more specifically with reference to FIG. 1, a user operates an input device 22 to set information necessary for reserving a volume and a port while looking at a screen for reservation management displayed on a display device 21. Next, a storage management program 200 retrieves reservable volumes and reservable ports using a volume retrieval subprogram 300 of a policy basis. At this point, when a policy concerning performance is inputted, the storage management program 200 inquires of a performance analysis program 900 of a storage performance management server 3 whether the performance is satisfied. When the volume and the port are found, the storage management program 200 stores reservation information in a reservation management DB 20 using a reservation subprogram 400. When the volume and the port are not found, the storage management program 200 judges whether an alternative volume for a reserved volume is present using a volume adjustment subprogram 500. When an alternative volume for the reserved volume is present, the storage management program 200 changes a reservation for the reserved volume to the alternative volume and makes a reservation for the information inputted anew. When the alternative volume for the reserved volume is not present, the storage management program 200 judges whether an alternative volume for a used volume is present using the volume adjustment subprogram 500. When the alternative volume is present, the storage management program 200 rearranges allocation to the alternative volume using a rearrangement program 700 and adds a reservation for the information inputted anew. When an alternative volume is not present in the used volume either, the storage management program 200 notifies the user that the reservation was unsuccessful through a reservation management GUI 123 of a storage management client 2.

When the reservation was successful, a reservation notice program 600 monitors the reservation management DB 20 and notifies the user that a start date of use of the volume has come through the reservation management GUI 23 of the storage management client 2. At the same time, the reservation notice program 600 allocates the volume or cancels allocation of the volume with respect to a storage management DB 10 using a storage management program 100.

BRIEF DESCRIPTION OF THE DRAWINGS

In the accompanying drawings:

FIG. 2 is a diagram showing an example of a volume management table 1100 stored in a storage management DB 10;

FIG. 3 is a diagram showing an example of a port management table 1200 stored in the storage management DB 10;

FIG. 4 is a diagram showing an example of a path management table 1300 stored in the storage management DB 10;

FIG. 5 is a diagram showing an example of a security group management table 1400 stored in the storage management DB 10;

FIG. 6 is a diagram showing an example of a volume reservation management table stored in a reservation management DB 20;

FIG. 7 is a diagram showing an example of a policy definition table 2200 stored in the reservation management DB 20 in the case in which a reservation is made on a policy basis;

FIG. 18 is a diagram showing an example of a preliminarily reservable volume reservation management table 2300 that is stored in the reservation management DB 20 when a preliminary reservation is made;

DETAILED DESCRIPTION OF PREFERRED EMBODIMENTS

An embodiment of the invention will be hereinafter explained with reference to the accompanying drawings.

Figure 1:
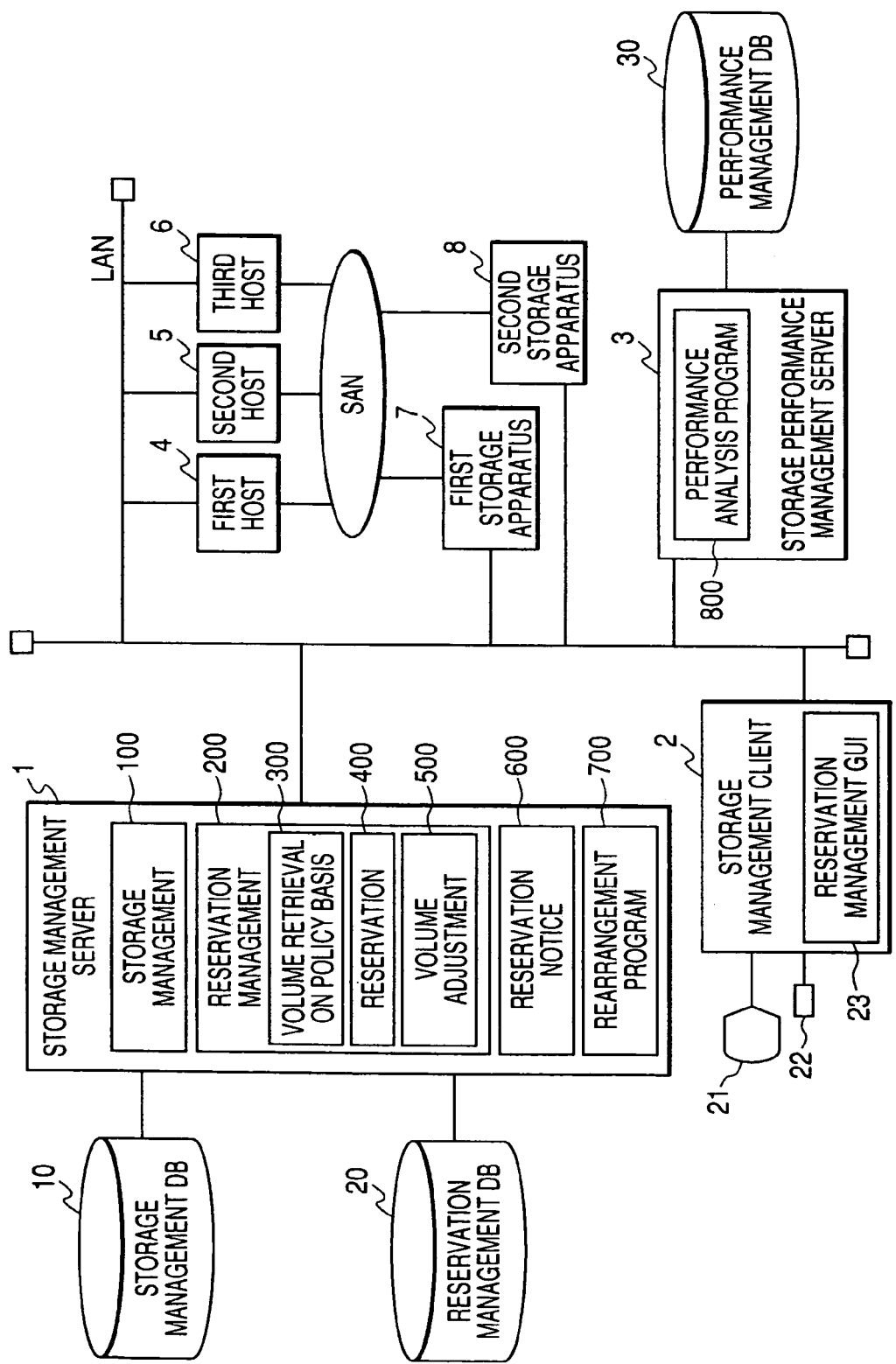
FIG. 1 is a diagram showing an overall structure of a storage management system according to an embodiment of the invention.

FIG. 1 is a diagram showing an overall structure of a storage management system according to an embodiment of the invention.

A first host 4, a second host 5, and a third host 6 are connected to a first storage apparatus 7 and a second storage apparatus 8 via a Storage Area Network (SAN). In addition, the first host 4, the second host 5, the third host 6, the first storage apparatus 7, and a second storage apparatus 8 are connected to a storage management server 1 for managing storages, a storage performance management server 3 for managing performance of the storages, and a storage management client 2 that is used by a user to perform an operation for storage management.

The first host 4, the second host 5, and the third host 6 are processing apparatuses that perform task processing for the user. The first storage apparatus 7 and a second storage apparatus 8 have plural volumes in which information is stored. Usually, these volumes are constituted by, for example, magnetic disk devices of a RAID configuration.

A performance analysis program 800 is stored in a memory in the storage performance management server 3. The performance analysis program 800 stores an analysis result in a performance management DB 30 and manages the analysis result. It is possible to adopt a well-known technique for the performance analysis program 800. The performance management DB 30 is adapted to be capable of extracting performance data such as frequency of reading/writing processing, transfer speed, a cache hit rate, and a CPU usage rate for each volume with a volume as a key.

A storage management program 100, a reservation management program 200, a reservation notice program 600, and a rearrangement program 700 are stored in a memory in the storage management server 1. The reservation management program 200 includes a volume retrieval subprogram 300 of a policy basis, a reservation subprogram 400, and a volume adjustment subprogram 500.

The storage management server 1 stores allocation of volumes of the first storage apparatus 7 and the second storage apparatus 8 to the first host 4, the second host 5, and the third host 6 and states of paths in a storage management DB 10 serving as a storage and manages the allocation and the states of paths using the storage management program 100. It is possible to use a well-known storage management program as the storage management program 100.

The storage management server 1 receives reservations for volumes and paths to be made from the first host 4, the second host 5, the third host 6 to the first storage apparatus 7 and the second storage apparatus 8, stores the reservations in a reservation management DB 20 serving as a storage, and manages the reservations.

In addition, when a requested reservation cannot be made, the storage management server 1 performs rearrangement of allocation of volumes using the rearrangement program 700 as required. It is possible to use a well-known migration technique or the like as the rearrangement program 700. Here, the storage management program 100, the reservation management program 200, the reservation notice program 600, and the rearrangement program 700 are arranged in the storage management server 1. However, these programs may be arranged in separate servers.

The storage management client 2 is, for example, a personal computer and includes a memory for storing a reservation management GUI 23 serving as a program, a display device 21, and an input device 22 such as a mouse or a keyboard. The reservation management GUI 23 on the storage management client 2 provides a user with a GUI for reservation management. In general, as a method of implementing the reservation management GUI 23, a WWW browser or a dedicated client program is used.

First, the user operates the input device 22 to set information necessary for reserving a volume and a port while looking at a screen for reservation management displayed on the display device 21. Next, the storage management program 200 retrieves reservable volumes and ports using the volume retrieval subprogram 300 of a policy basis. At this point, when a policy concerning performance is inputted, the storage management program 200 inquires of a performance analysis program 900 of the storage performance management server 3 whether the performance is satisfied. When the volume and the port are found, the storage management program 200 stores reservation information in the reservation management DB 20 using the reservation subprogram 400. When the volume and the port are not found, the storage management program 200 judges whether an alternative volume for a reserved volume is present using the volume adjustment subprogram 500. When the alternative volume for the reserved volume is present, the storage management program 200 changes a reservation for the reserved volume to the alternative volume and makes a reservation for the information inputted anew. When the alternative volume is not present in the reserved volume, the storage management program 200 judges whether an alternative volume for a used volume is present using the volume adjustment subprogram 500. When the alternative volume for the used volume is present, the storage management program 200 rearranges allocation to the alternative volume using the rearrangement program 700 and adds a reservation for the information inputted anew. When the alternative volume is not present in the used volume either, the storage management program 200 notifies the user that the reservation was unsuccessful through the reservation management GUI 23 of the storage management client 2.

When the reservation was successful, the reservation notice program 600 monitors the reservation management DB 20 and notifies the user that a start date of use of the volume has come through the reservation management GUI 23 of the storage management client 2. At the same time, the reservation notice program 600 allocates the volume or cancels allocation of the volume with respect to a storage management DB 10 using a storage management program 100.

FIG. 2 is a diagram showing an example of a volume management tale 1100 stored in the storage management DB 10. In the volume management table 1100, a volume ID 1101 for identifying a physical volume in a storage, a state 1102 indicating whether the volume is 'allocated' or 'not allocated', a RAID level 1103 indicating a RAID configuration of the volume, a DiskType 1104 indicating a type of a magnetic disk, and a capacity 1105 of a volume are managed. In this embodiment, the volume management table 1100 is managed for each subsystem. However, it is also possible to manage volumes of plural subsystem apparatus is one table. The RAID level includes RAID0, RAID1, RAID5, and RAID10, which have different degrees of performance, reliability, and the like. The DiskType includes an ATA (AT) base and an FC base, which have different prices and different degrees of reliability.

The volume management table 1100 manages reservation states of all volumes including allocated volumes.

FIG. 3 is a diagram showing an example of a port management table 1200 stored in the storage management DB 10. In the port management table 1200, a port number 1201 for identifying a port, a state 1202 indicating whether the port is 'used' or 'unused', and a security 1203 indicating whether security is set for the port are managed. In the security, a case in which security is set is managed as 'ON', and a case in which security is not set is managed as 'OFF'. In this embodiment, security for laying open a volume only to hosts registered in a security group is described as an example. However, it is also possible to implement security for a port with another method. In addition, in this embodiment, the port management table 1200 is managed for each subsystem (here, the subsystem means the first storage apparatus 7 or the second storage apparatus 8). However, it is also possible to manage volumes of plural subsystem apparatuses in one table.

FIG. 4 is a diagram showing an example of a path management table 1300 stored in the storage management DB 10. In the path management table 1300, a port number 1301 of a port to which a path is spread, a volume ID 1302 of a volume to which a path is spread, and a security group number 1303 for managing a connection destination in the case in which security is set are managed. In this embodiment, the path management table 1300 is managed for each subsystem. However, it is also possible to manage volumes of plural subsystem apparatuses in one table.

FIG. 5 is a diagram showing an example of a security group management table 1400 stored in the storage management DB 10. In the security group management table 1400, a security group number 1401 for managing a security group and a host name 1402 of a host included in the security group are managed. When the security 1201 of the port management table 1200 is set to 'ON' and a path is spread for a security group, it is possible to prevent hosts other than hosts set in the security group from referring to a volume.

FIG. 6 is a diagram showing an example of a volume reservation management table 2100 stored in the reservation management DB 20. In the volume reservation management table 2100, a reservation ID 2101, a volume ID 2102 of a volume to be reserved, a period of use 2103, a port number 2104 of a port to be reserved, a reliability policy 2105 and a performance policy 2106 for managing policies when a reservation is made on a policy basis, a security policy 2108, a state 2108 indicating whether a volume is allocated or still reserved after the reservation, a security group number 2109, and a host name 2110 of a host that has made the reservation are managed. In this embodiment, the volume reservation management table 2100 is managed for each subsystem. However, it is also possible to manage volumes of plural subsystem apparatuses in one table.

It is possible to use the volume reservation management table 2100 in order to manage a period of use not only for a reserved volume but also for an allocated volume. When allocation is cancelled, the volume reservation management table 2100 is deleted.

FIG. 7 is a diagram showing an example of a policy definition table 2200 stored in the reservation management DB 20 that is used when a reservation is made on a policy basis. When storage management is also performed on a policy basis, it is possible to carry out the invention even if the policy definition table 2200 is managed in the storage management DB 10. In the policy definition table 2200, it is possible to define a policy type 2201 indicating whether a policy is a reliability policy or a performance policy, a level 2202 of the policy, an attribute 2203, and an attribute value 2204 for the attribute. It is necessary to define attributes and attribute values with respect to respective levels (high, medium, and low) of each policy.

Figure 8:
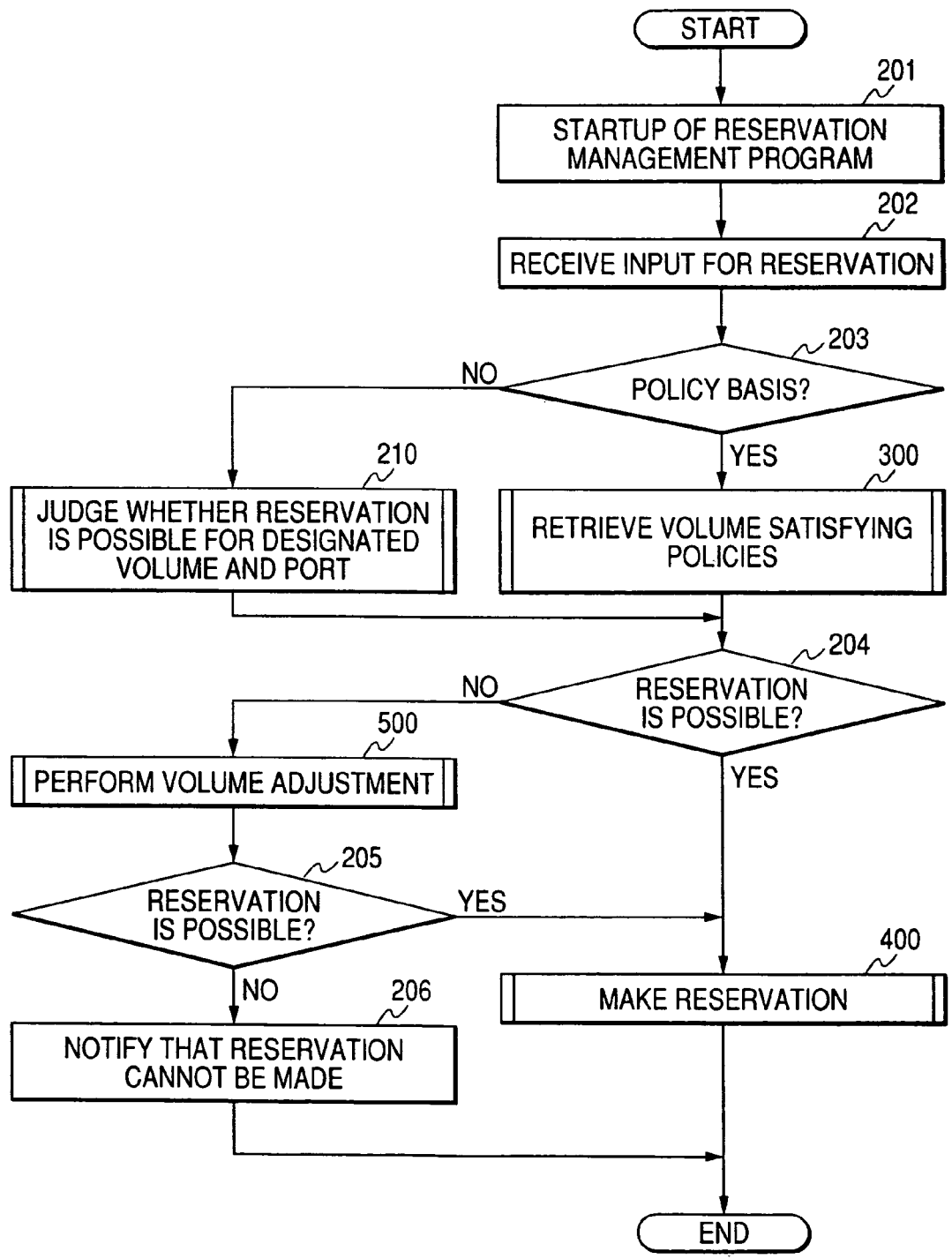
FIG. 8 is a processing flow of reservation management according to the embodiment.

FIG. 8 is a processing flow of reservation management according to the embodiment of the invention. A reservation management method will be explained with reference to a flowchart in FIG. 8. A user operates the input device 22 of the storage management client 2 to start the reservation management program 200 (201). In the storage management client 2, the reservation management GUI 23 is started to urge a user to input information necessary for a reservation. The user operates the input device 22 to designate a host name, a period of use, a capacity, and a security policy. The user designates a host name to be registered in a security group when the security policy is 'ON', designates a performance policy and a reliability policy when the reservation is on a policy basis, and designates a volume, a port, and the like when the reservation is not on a policy basis. The reservation management program 200 receives inputted reservation information (202). The reservation management program 200 judges whether the inputted reservation request is on a policy basis (203) and, if the reservation request is on a policy basis, calls an allocatable volume retrieval subprogram 300 (300). If the reservation request is not on a policy basis, the reservation management program 200 executes processing in FIG. 9 and judges whether it is possible to use the usable designated volume and port in a period of use (210). The reservation management program 200 judges whether the reservation is possible as a result of the respective pieces of processing (204). If the reservation is possible, the reservation management program 200 executes the reservation subprogram 400 and performs the reservation (400). If the reservation is impossible, the reservation management program 200 performs reservation adjustment of the volume with the volume adjustment subprogram (500). The reservation management program 200 judges whether the reservation has become possible as a result of the adjustment (205). If the reservation is possible, the reservation management program 200 performs the reservation (400) and, if the reservation is impossible, notifies the user that the reservation was unsuccessful (206) and ends the processing.

Figure 9:
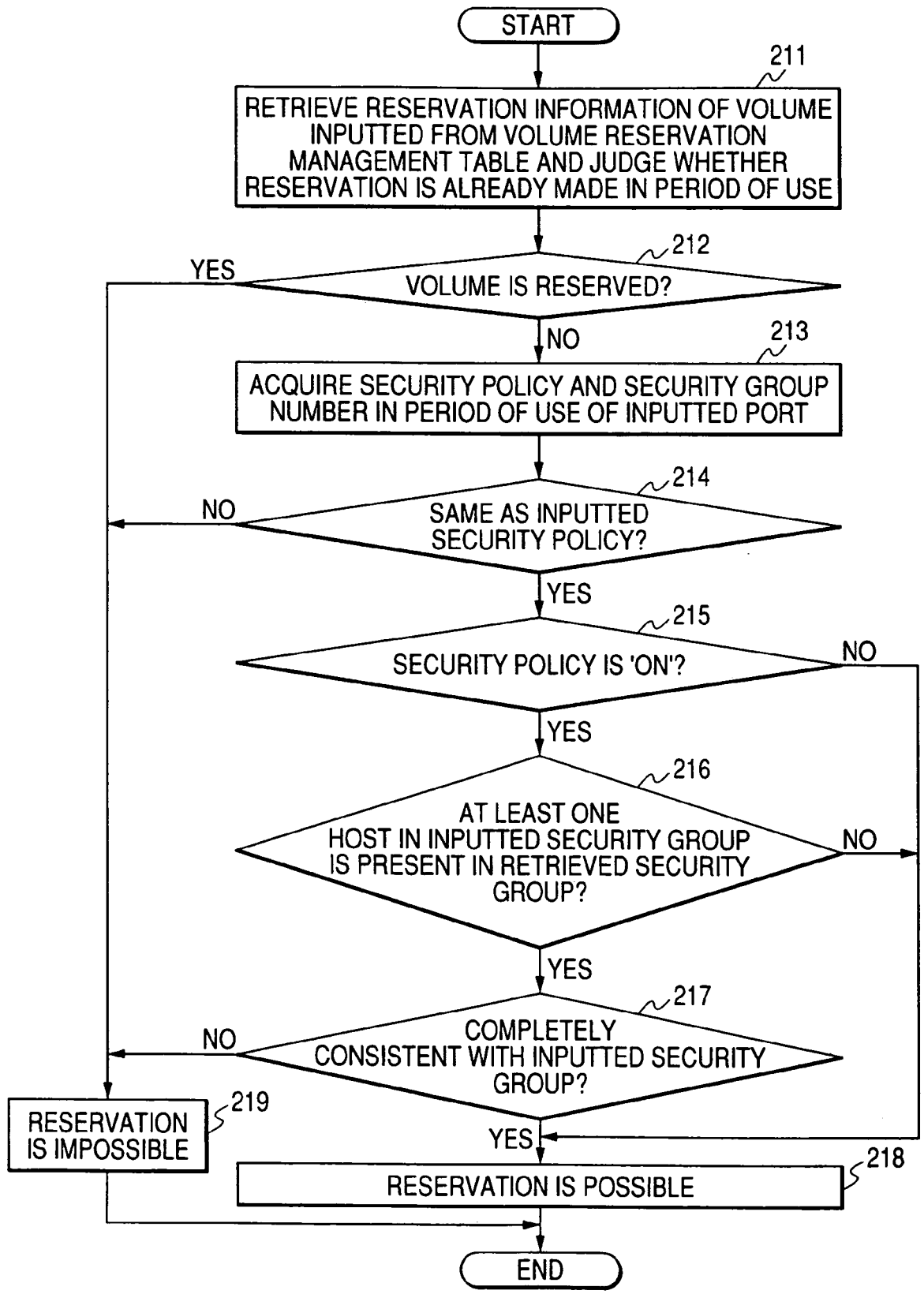
FIG. 9 is a processing flow for judging, in the case in which a reservation not of a policy basis is made, whether the reservation is possible in the processing flow of reservation management according to the embodiment.

FIG. 9 is a processing flow for judging, in the case in which a reservation not on a policy basis is made, whether the reservation is possible in the processing flow of reservation management according to the embodiment of the invention. The reservation management program 200 retrieves a reservation state for an inputted volume from the volume reservation management table 2100 and checks whether a reservation has already been made in a period of use (211). The reservation management program 200 judges whether the volume is reserved (212) and, if the volume is already reserved, judges that the reservation is impossible (219) and ends the processing. If the volume is not reserved, the reservation management program 200 acquires a security policy and a security group number during the period of use of the inputted port from the volume reservation management table 2100 (213). The reservation management program 200 judges whether the inputted security policy and the acquired security policy are the same (214) and, if the inputted security policy and the acquired security policy are not the same, judges that the reservation is impossible (219) and ends the processing. If the inputted security policy and the acquired security policy are the same the reservation management program 200 judges whether the security policy is 'ON' (215) and, if the security policy is 'OFF', judges that the reservation is possible (218) and ends the processing. If the security policy is 'ON', the reservation management program 200 judges whether at least one host in a security group to be reserved is present in the security group retrieved in step 213 (216). If the host is not present in the security group, the reservation management program 200 judges that the reservation is possible (218) and ends the processing. If the host is present in the security group, the reservation management program 200 judges whether the inputted security group is completely consistent with the security group retrieved in step 213 (217) and, if both the security groups are completely consistent with each other, judges that the reservation is possible (218) and ends the processing. If both the security groups are not consistent with each other, the reservation management program 200 judges that the reservation is impossible (219) and ends the processing.

Figure 10:
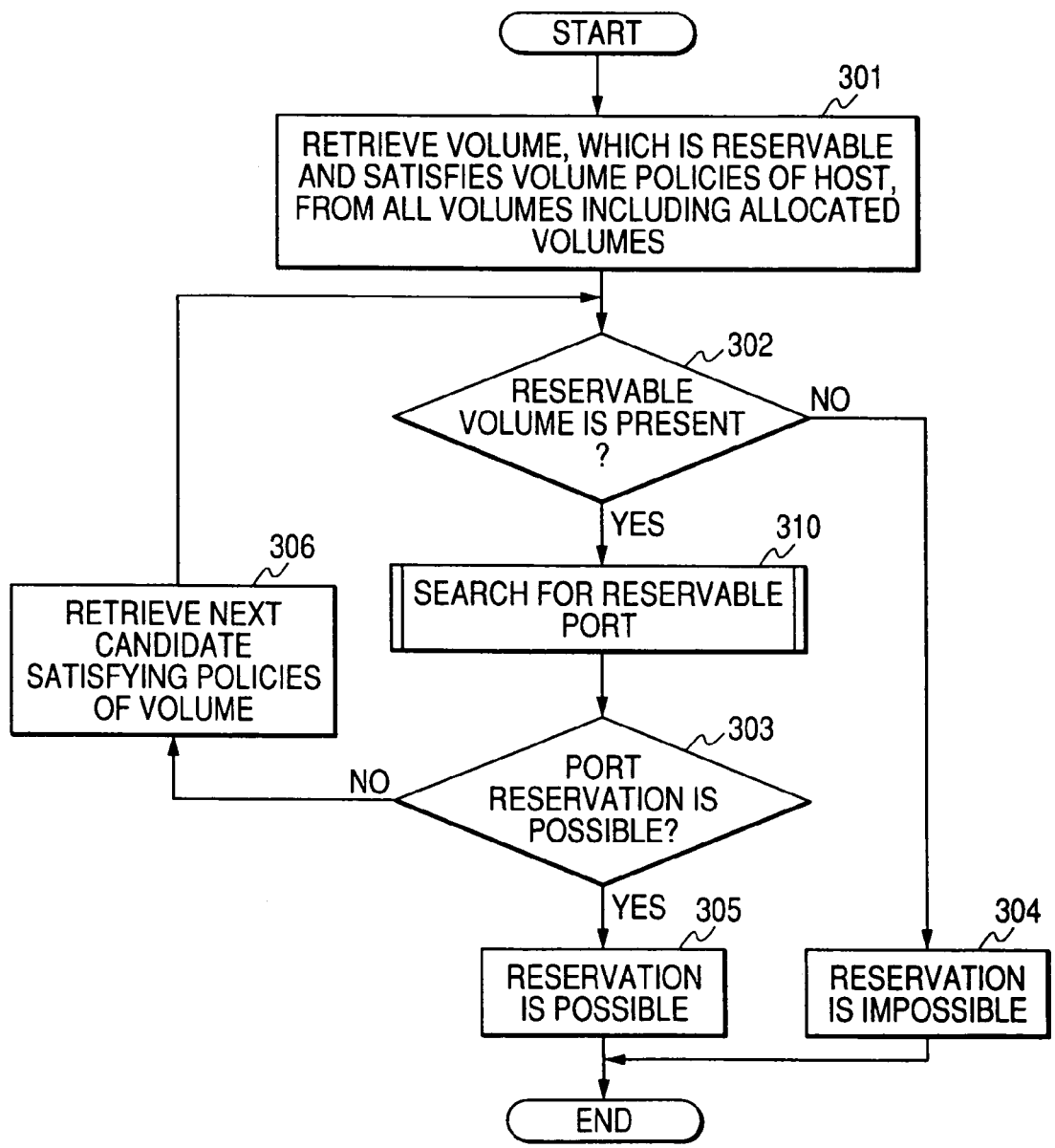
FIG. 10 is a processing flow of a volume retrieval subprogram of a policy basis in the processing flow of reservation management according to the embodiment.

FIG. 10 is a processing flow of a volume retrieval subprogram of a policy basis in the processing flow of reservation management according to the embodiment of the invention.

In this processing, a volume only has to satisfy requirements of policies and is not required to be completely consistent with the policies.

First, in order to judge whether a volume satisfies policies, the reservation management program 200 acquires an attribute and an attribute value corresponding to an inputted level from the policy definition table 2200 in FIG. 7. Next, the reservation management program 200 retrieves volumes satisfying conditions from the volume management table 1100. There may be one or plural volumes for satisfying a capacity. It is also possible to make it possible to designate whether there is one or plural volumes as a policy. If a volume satisfying the conditions is present, the reservation management program 200 retrieves volumes, which are not reserved in a period of use, from the volume reservation management table 2100 (301). The reservation management program 200 judges whether a reservable volume is present (302) and, if a reservable volume is not present, judges that the reservation is impossible (304) and ends the processing. If the reservable volume is present, the reservation management program 200 searches for a port, to which a path can be spread in the period of use, is present with respect to the volume in reservable port retrieval processing in FIG. 11 (310). The reservation management program 200 judges whether a reservable port is present (303) and, if a reservable port is present, judges that the reservation is possible (305) and ends the processing. If a port, to which a path can be spread in the period of use, is not present, the reservation management program 200 retrieves another reservable volume (306) and continues the processing.

Figure 11:
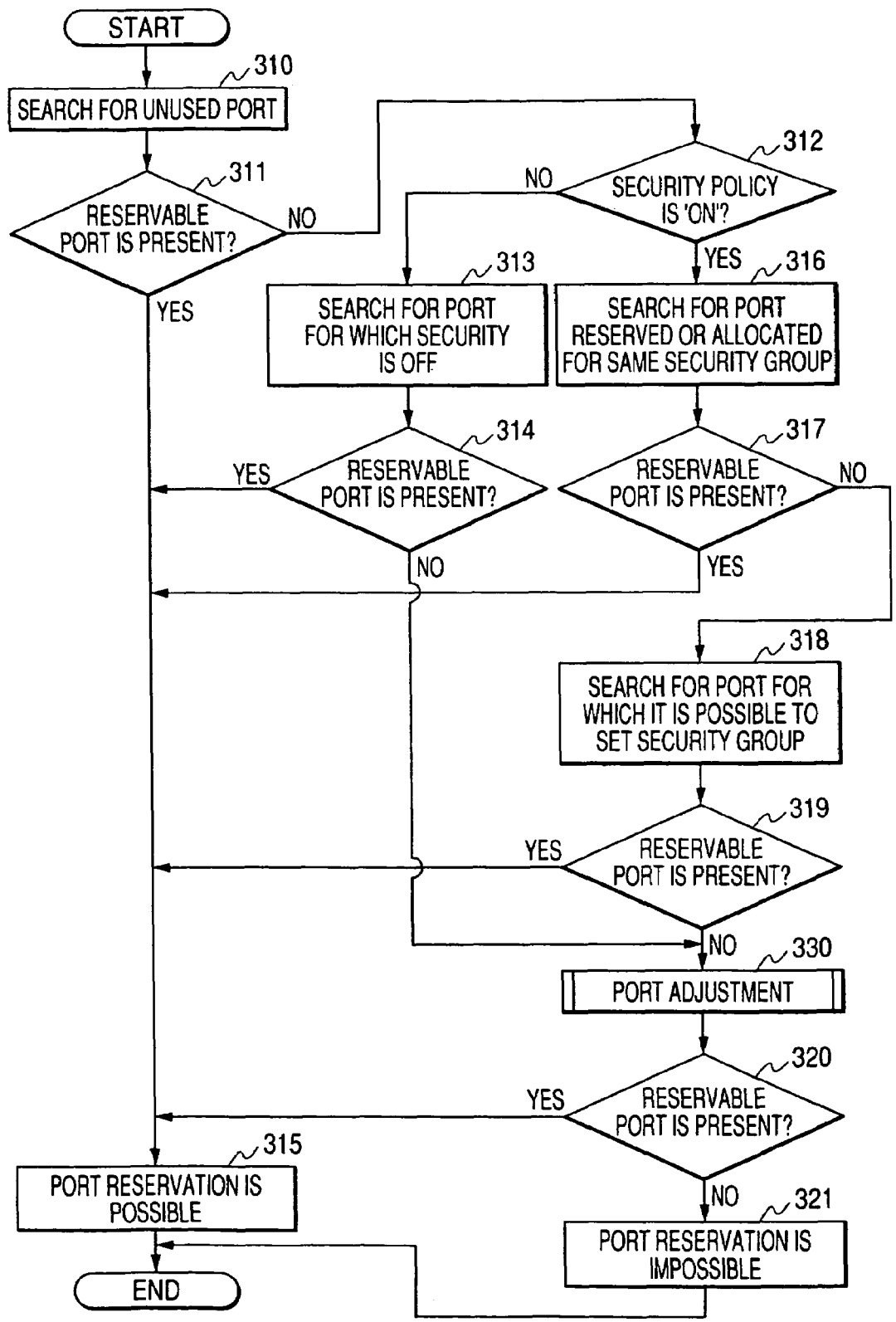
FIG. 11 is a processing flow of processing for performing retrieval of a reservable port in a processing flow of a volume retrieval program of a policy basis according to the embodiment.

FIG. 11 is a processing flow of processing for performing retrieval of a reservable port in a processing flow of a volume retrieval program of a policy basis according to the embodiment of the invention.

First, the reservation management program 200 searches for an unused port in an inputted period of use (310). The reservation management program 200 judges whether an unused port is found (311) and, if an unused port is found, judges that it is possible to reserve the port (315) and ends the processing. It is assumed that it is possible to designate a reservation for plural ports as a policy. If plural ports are designated, the reservation management program 200 repeats the processing until the designated number of ports are found. If an unused port is not found, the reservation management program 200 judges whether an inputted security policy is 'ON' (312). If the inputted security policy is 'OFF', the reservation management program 200 retrieves a port to be made 'security OFF' in an inputted period of use (313). The reservation management program 200 judges whether a port to be made 'security OFF' is found (314) and, if a port to be made 'security OFF' is found, judges that it is possible to reserve the port (315) and ends the processing. It is also possible to set a performance policy for a path. In that case, the reservation management program 200 calls the performance analysis program of the storage performance management server 3 and judges whether a path to be connected to this path satisifies policies.

Figure 12:
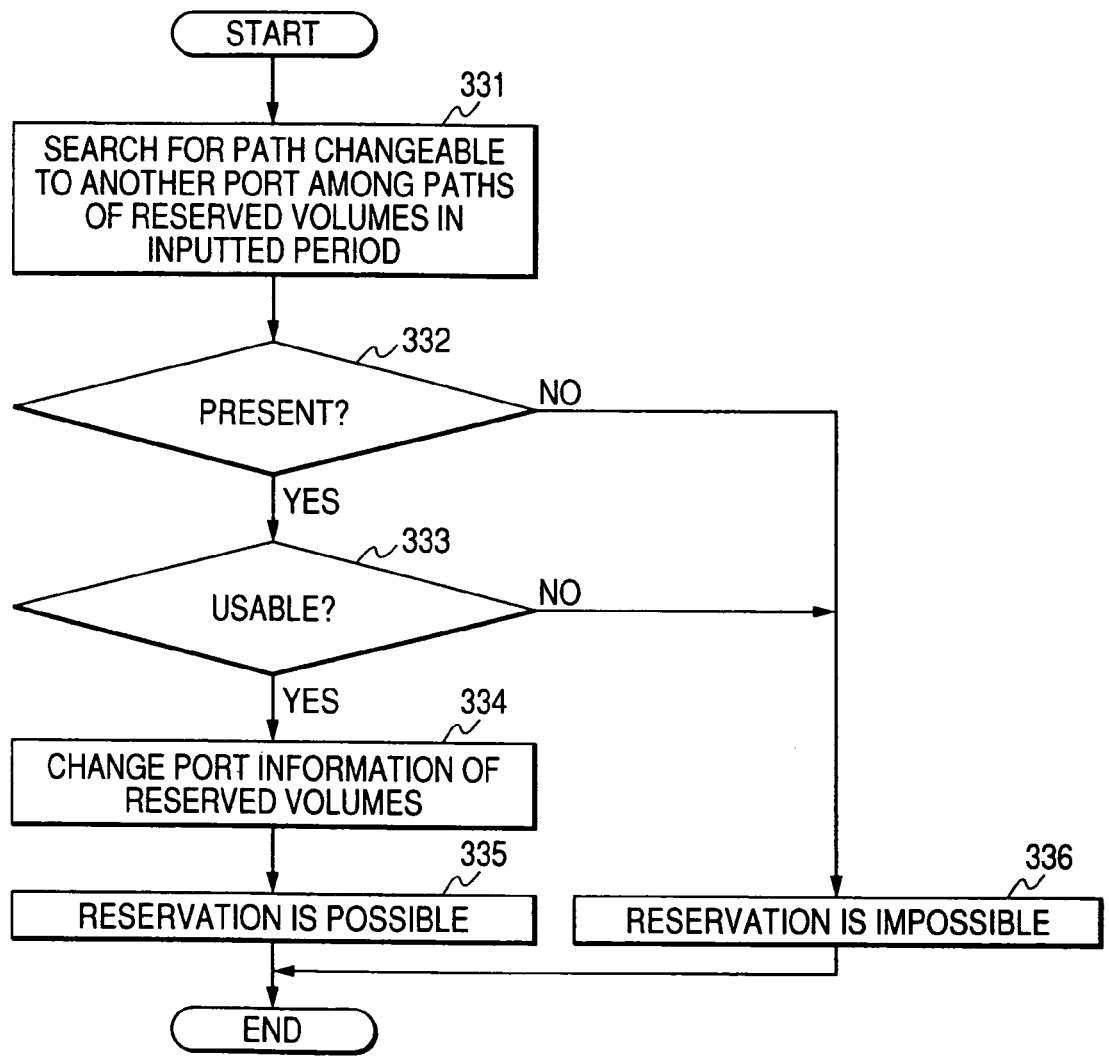
FIG. 12 is a processing flow for retrieving reservable ports by allocating a port allocated to a reserved volume to another port in the case in which a reservable port is not present in the processing for performing retrieval of reservable ports according to the embodiment.

If a port to be made 'security OFF' is not found in step 314, the reservation management program 200 performs port adjustment processing in FIG. 12 (330) and judges whether a reservation for a port has been made possible by the adjustment of ports (320). If a reservation for a port has been made possible, the reservation management program 200 judges that it is possible to reserve the port (315) and ends the processing. If a reservable port is not found in step 320, the reservation management program 200 judges that it is impossible to reserve a port (321). If it is judged in step 312 that the security policy is 'ON', the reservation management program 200 retrieves a reserved or allocated port with respect to the same security group among ports for which security is 'ON' in the inputted period of use (316). The reservation management program 200 judges whether a reserved or allocated port is found (317) and, if a reserved or allocated port is found, judges that it is possible to reserve the port (315) and ends the processing. If a reserved or allocated port is not found, the reservation management program 200 retrieves a port to which all hosts of the security group, which is inputted to the security group connected to the security group connected to the port, do not belong in the inputted period of use, among the ports for which security is 'ON' (318). The reservation management program 200 judges whether a port to which all the hosts do not belong is found (319) and, if a port to which all the hosts do not belong is found, the reservation management program 200 judges that it is possible to reserve the port (315). If a port to which all the hosts do not belong is not found, the reservation management program 200 performs the port adjustment processing in FIG. 12 (330) and judges whether it is made possible to reserve a port by the adjustment of ports (320).

FIG. 12 is a processing flow for retrieving a usable port by allocating a port allocated to a reserved volume to another port in the case in which a reservable port is not present in the processing for performing retrieval of a reservable port according to the embodiment of the invention.

First, the reservation management program 200 searches for a path, which is changeable to another port, among paths of reserved volumes in an inputted period of use (331). The reservation management program 200 judges whether a corresponding reservation is present and, if a corresponding reservation is present, judges whether a port is made usable by changing the reservation (333). As judgment processing, the processing from steps 312 to 319 in FIG. 11 is performed. If a reservable port is not present in steps 314 and 319, the reservation management program 200 judges that it is impossible to reserve the port (336). If the port is usable, the reservation management program 200 changes a port number of the volume reservation management table 2100 (334), judges that a port, which is reservable with respect to an inputted new reservation, is present (335), and ends the processing.

Figure 13:
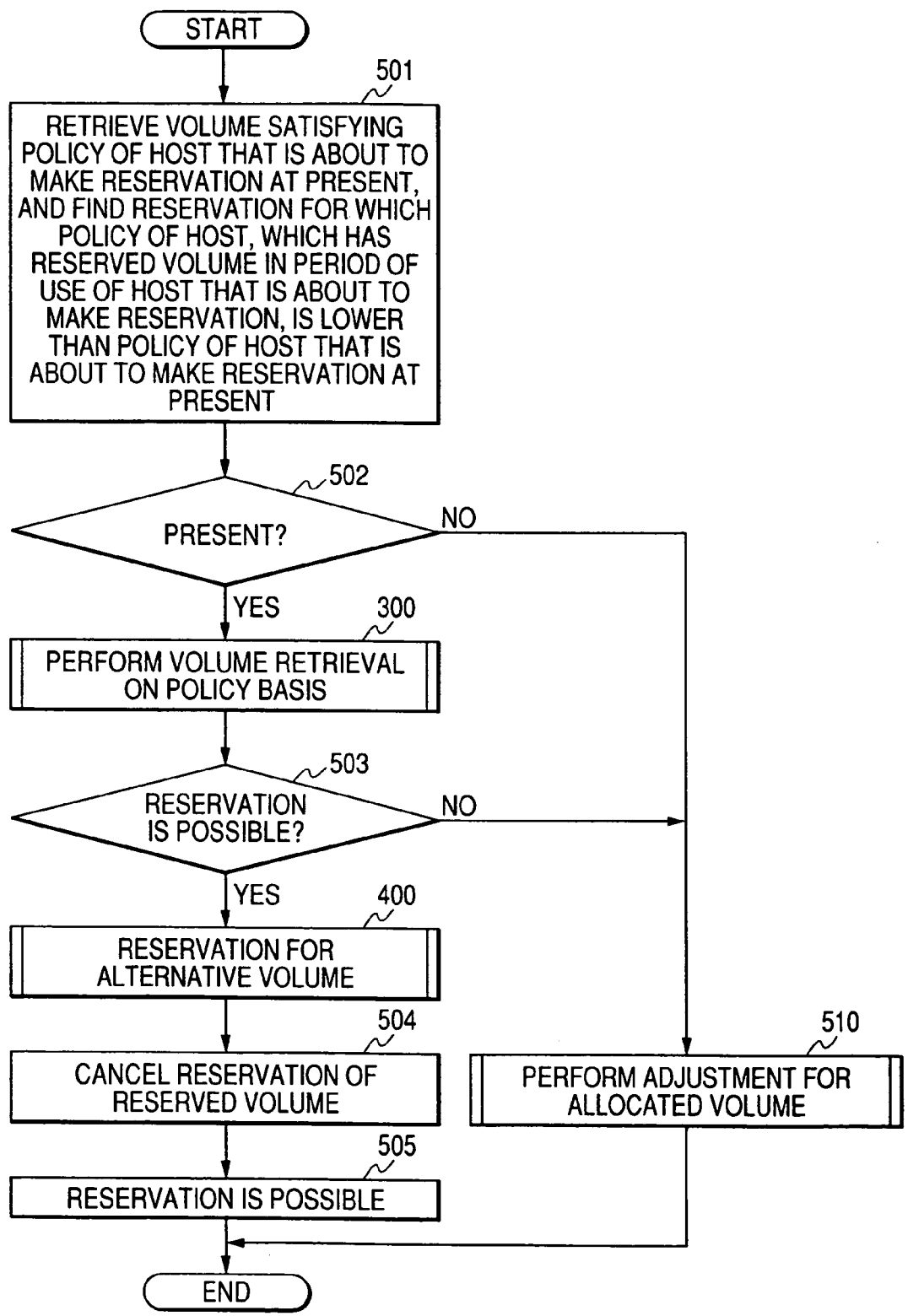
FIG. 13 is a processing flow of processing for performing reservation adjustment of a volume in the processing flow of reservation management according to the embodiment.

FIG. 13 is a processing flow of processing for performing reservation adjustment of a volume in the processing flow of reservation management according to the embodiment of the invention. When policies of a host of a reserved volume are lower than policies of the volume, it is possible to change a reservation for the host reserving the volume to another volume. Here, only when policies of the host reserving the volume are lower than inputted policies of the host, reservation change for a volume is performed.

First, in order to judge whether a volume satisfies policies, the reservation management program 200 acquires an attribute and an attribute value corresponding to an inputted level from the policy definition table 2200 in FIG. 7. Next, the reservation management program 200 retrieves volumes satisfying conditions from the volume management table 1100. Next, the reservation management program 200 retrieves reservations made in an inputted period of use for the volumes from the volume reservation management table 2100 and retrieves a reservation having policies of a reserved volume lower than inputted policies (501). The reservation management program 200 judges whether a reservation with the lower policies is present (502) and, if a reservation with the lower policies is present, retrieves an alternative volume for the reserved volume according to a volume subprogram of a policy basis (300). The reservation management program 200 judges whether a reservable alternative volume is present (503), if an alternative volume is reservable, performs a reservation using the reservation subprogram 400 (400), deletes the reservation of the reserved volume from the volume reservation management table 2100 (504), judges that it is possible to reserve the alternative volume (505), and ends the processing. If an alternative volume is not present in step 503, the reservation management program 200 performs adjustment processing for an allocated volume in FIG. 14 (510).

Figure 14:
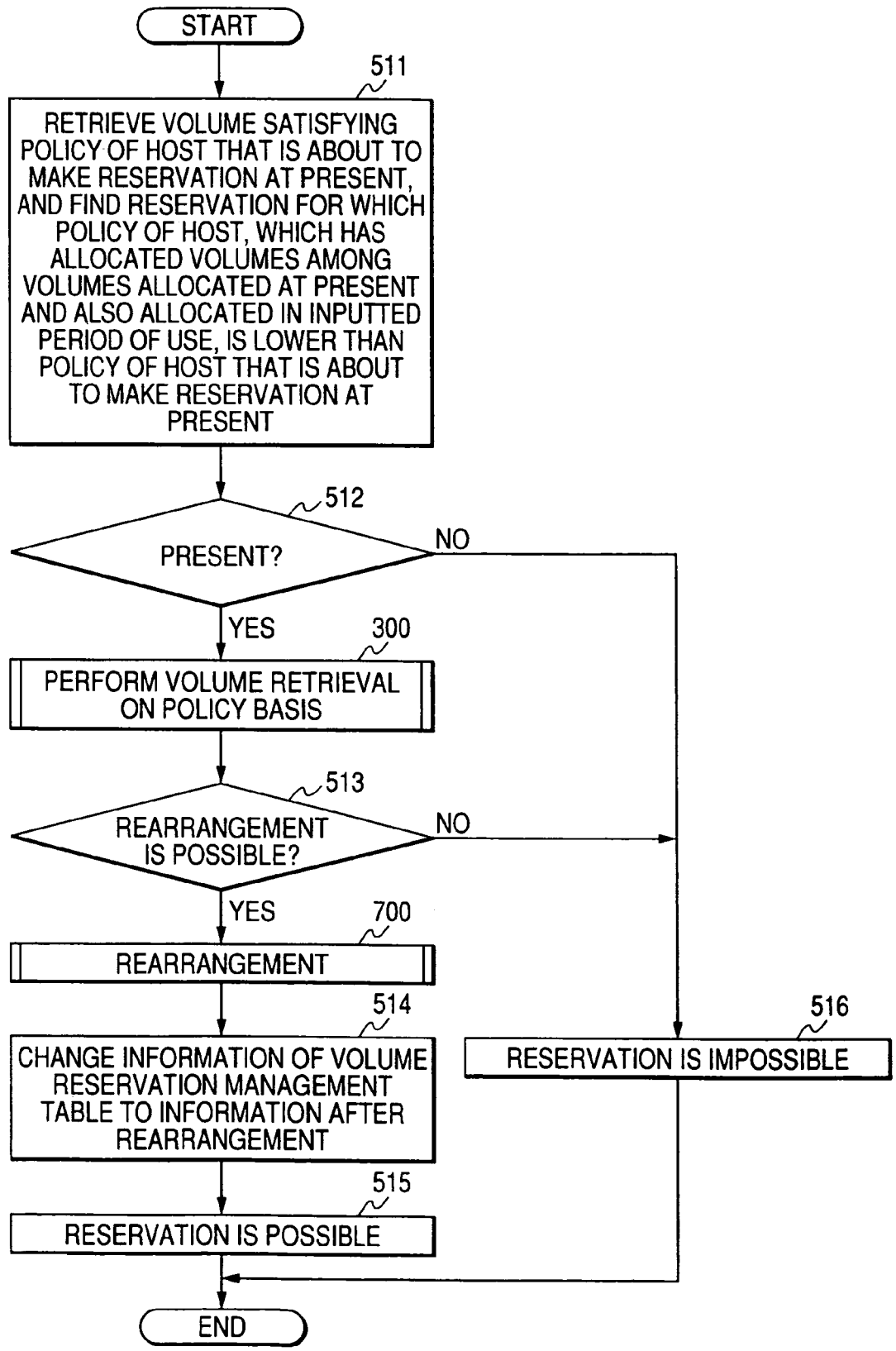
FIG. 14 is a processing flow of processing for performing adjustment of an allocated volume in the processing for performing reservation adjustment of a volume according to the embodiment.

FIG. 14 is a processing flow of processing for performing adjustment of an allocated volume in the processing for performing reservation adjustment of a volume according to the embodiment of the invention.

When policies of a host of an allocated volume are lower than policies of the volume, it is possible to change allocation of the allocated volume of the host to another volume. Here, adjustment of a volume is performed only when the policies of the host, to which the volume is allocated, are lower than inputted policies of the host.

First, in order to judge whether the volume satisfies the policies, the reservation management program 200 acquires an attribute and an attribute value corresponding to an inputted level from the policy definition table 2200 in FIG. 7. Next, the reservation management program 200 retrieves volumes satisfying conditions from the volume management table 1100. Next, the reservation management program 200 retrieves a reservation, which is allocated presently and has allocated policies of the host lower than inputted policies of the host, among reservations made in an inputted period of use for the volumes from the volume reservation management table 2100 (511).

The reservation management program 200 judges whether a reservation with the lower policies is present (512) and, if a reservation with the lower policies is present, searches for an alternative volume for the allocated volume using a volume subprogram of a policy basis (300). The reservation management program 200 judges whether an alternative volume, which can be rearranged, is present (513), if the rearrangement is possible performs the rearrangement using the rearrangement program 700 (700), deletes reservation information from the volume reservation management table 2100 (514), judges that the reservation is possible (515), and ends the processing. If an alternative volume is not present in step 613, the reservation management program 200 judges that the reservation is impossible (516) and ends the processing.

Figure 15:
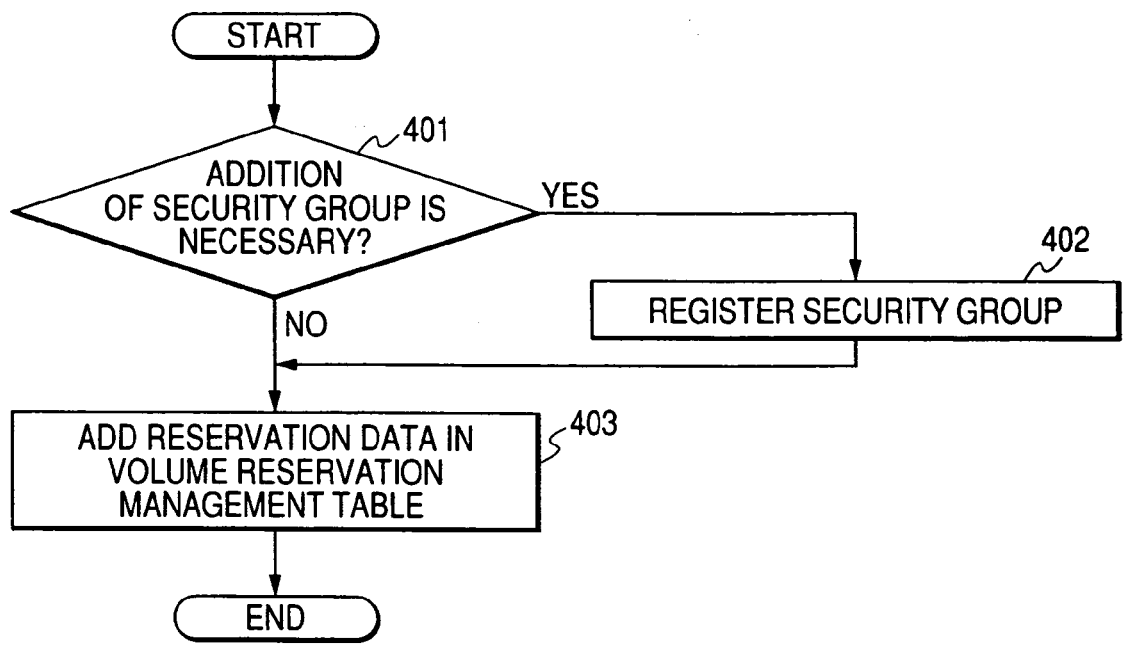
FIG. 15 is a processing flow of a reservation subprogram in the processing flow of reservation management according to the embodiment.

FIG. 15 is a processing flow of a reservation subprogram in the processing flow of reservation management according to the embodiment of the invention.

The reservation management program 200 judges whether it is necessary to register a security group anew (401) and, if it is necessary to register a security group anew, stores the security group in the security group management table 1400 of the storage management DB 10 if necessary (402). Then, the reservation management program 200 stores a reservable volume ID and port number, an inputted period of use, a port number, a reliability policy, a performance policy, a security policy, a state, a security group number, and a host name in the volume reservation management table 2100. When it is necessary to register a security group anew, the reservation management program 200 stores the security group in the security group management table 1400 of the storage management DB 10 (403) and ends the processing.

Figure 16:
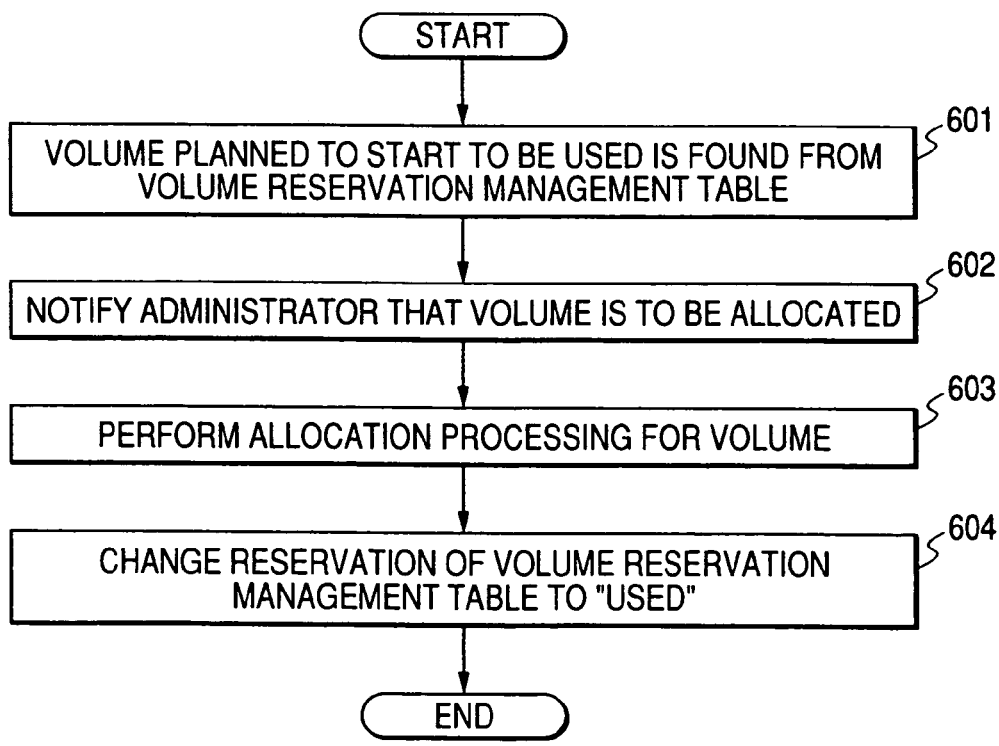
FIG. 16 is a processing flow of processing for notifying a user of start of use of a reserved volume at the time of the start of use according to the embodiment.

FIG. 16 is a processing flow of processing for notifying a user of start of use of a reserved volume at the time of the start of use according to the embodiment of the invention.

The reservation notice program 600 monitors the volume reservation management table 2100 of the reservation management DB 20. When a reservation required to start to be used is found (601), the reservation notice program 600 notifies a user of the reservation through the reservation management GUI 23 of the storage management client 2 (602). At this point, the user can change a volume to be allocated or cancel a reservation using the reservation management GUI 23. When there is no change or cancellation of a volume, the reservation notice program 600 changes the state 1102 of the volume of the volume management table in the storage management DB 10 to "allocated", changes the state 1202 of the port management table 1200 to "used", sets the security 1203 to a security policy 2107 acquired from the volume reservation management table 2100, and adds the port number 1301, the volume 1302, and the security group number 2109 acquired from the volume reservation management table 2100 in the path management table 1300 using the storage management program 100 of the storage management server 1 (603). The reservation notice program 600 changes the table 2108 of the volume reservation management table 2100 to "allocated" (604).

Figure 17:
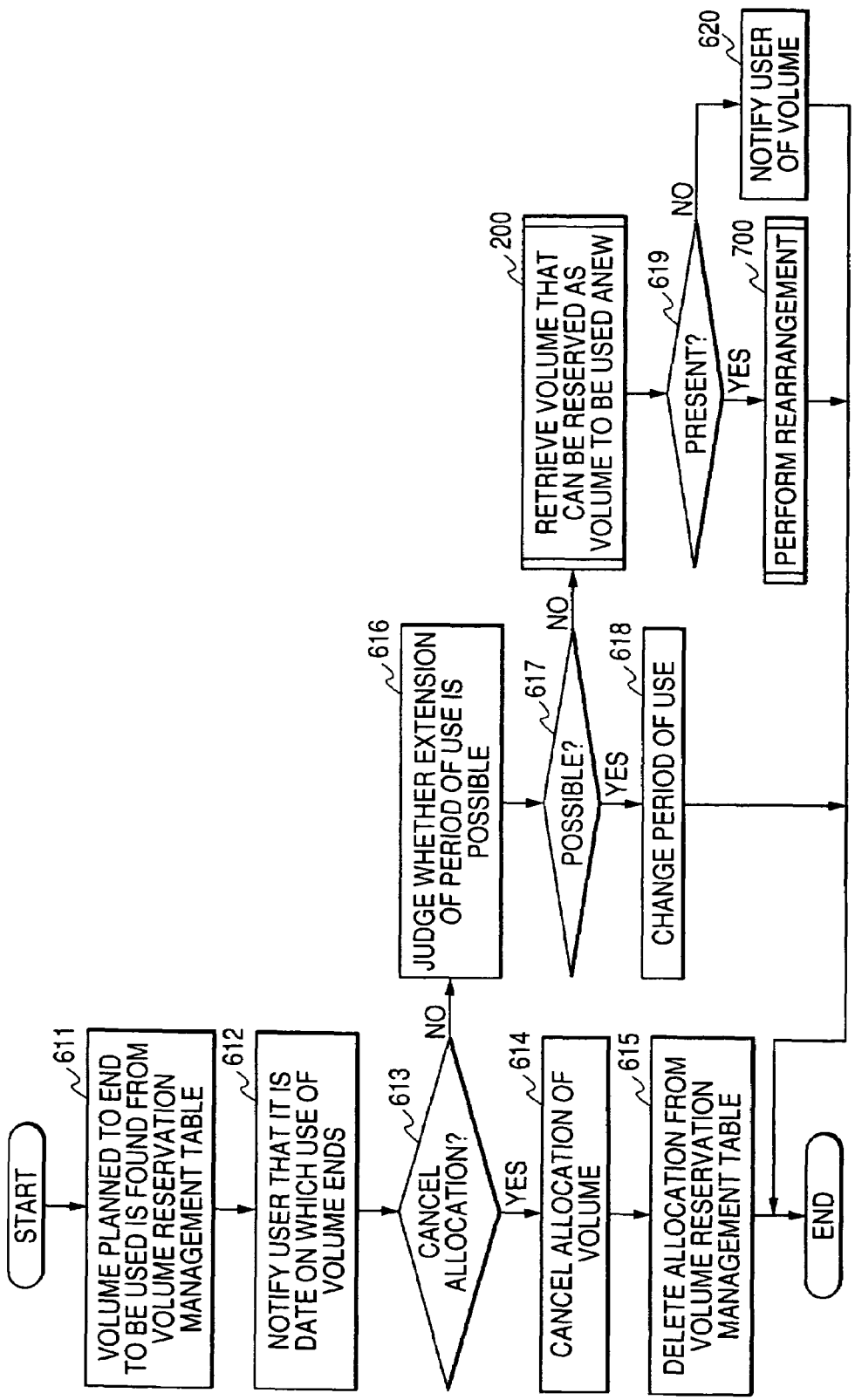
FIG. 17 is a processing flow of processing for notifying a user of end of use of an allocated volume at the time of the end of use according to the embodiment.

FIG. 17 is a processing flow of processing for notifying a user of end of use of an allocated volume at the time of the end of use according to the embodiment of the invention.

The reservation notice program 600 monitors the volume reservation management table 2100 of the reservation management DB 20. When a reservation required to end to be used is found (611), the reservation notice program 600 notifies a user of the reservation through the reservation management GUI 23 of the storage management client 2. The reservation notice program 600 judges whether the user consents to cancellation of volume allocation through the reservation management GUI 23 (613) and, if the user consents to the cancellation of volume allocation, in order to cancel the allocation, changes the state 1102 of the volume management table 1100 in the storage management DB 10 to "not allocated", deletes all corresponding paths from the path management table 1300, searches through the path management table 1300 to find whether a port is not used due to deletion of the paths, and changes the state of the port management table 1200 to "unused" only when the port is not used (614). Next, the reservation notice program 600 deletes reservation information from the volume reservation table 2100 in the reservation management DB 20 (614). If the user does not consent to the cancellation of volume allocation in step 613, the reservation notice program 600 searches through the volume reservation management table 2100 to judge whether it is possible to extend the period of use (616). The reservation notice program 600 judges whether it is possible to extend the period of use (617) and, if it is possible to extend the period of use, changes the period of use of the volume reservation management table (618). If it is impossible to extend the period of use, the reservation notice program 600 retrieves a volume for the extended period using the reservation management program 200 (200) and judges whether the volume is found (619). If the volume is found, the reservation notice program 600 performs rearrangement using the rearrangement program 700 (700). If the volume is not found, the reservation notice program 600 notifies the user that the volume is not found (620). Here, the user can also adjust volumes by, for example, reducing a capacity, reducing redundant paths, and lowering levels of policies.

As an example in which this embodiment is developed, an embodiment in the case in which, when a volume cannot be reserved with inputted policies, the volume is preliminarily reserved with other policies, will be explained.

FIG. 18 is a diagram showing an example of a preliminarily reservable volume reservation management table 2300 that is stored in the reservation management DB 20 when a preliminary reservation is made. The preliminarily reservable volume reservation management table 2300 is a table obtained by adding a preliminary reservation 2301, a capacity 2302, and the number of ports 2303 to the volume reservation management table in FIG. 6.

When it is impossible to reserve a volume satisfying policies, a reservation is made with relaxed conditions of the policies and the reservation is set as a preliminary reservation in the preliminarily reservable volume reservation management table 2300. Consequently, it is possible to reserve a volume, which a user desires to acquire originally, by monitoring whether there is an unused volume satisfying the policies at timing, for example, when a reservation is cancelled. A method of making a preliminary reservation includes lowering required levels of policies, reducing a capacity, or reducing the number of ports. The user can select a method of a preliminary reservation, or a method of a preliminary reservation can be allocated automatically by a program.

Figure 19:
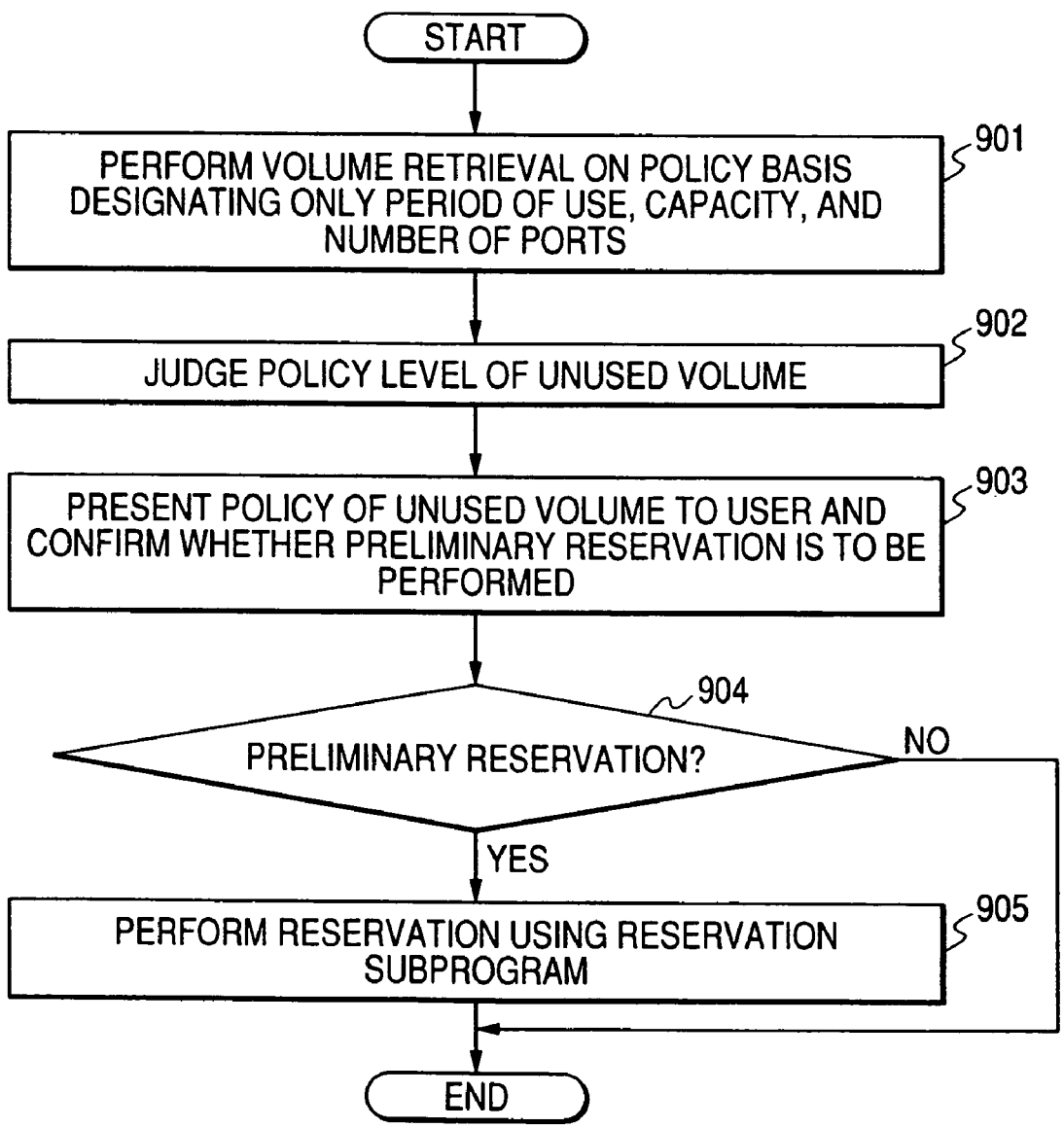
FIG. 19 is a processing flow in the case in which, when a preliminary reservation is made, the preliminary reservation is made by lowering a level of a policy.

FIG. 19 is a processing flow in the case in which, when a preliminary reservation is made, the preliminary reservation is made by lowering levels of policies.

A user designates only a period of use, a capacity, and the number of ports to execute the volume retrieval subprogram 300 of a policy basis (901). When an unused volume is found, the volume retrieval subprogram 300 analyzes an attribute of the volume from the volume management table 1100, analyzes performance of a path from the performance analysis program 900 of the storage performance management server 3, and compares the attribute and the performance with those in the policy definition table 2200 to thereby judge policy levels of the volume (902). The volume retrieval subprogram 300 presents policies of the unused volume and confirms whether a preliminary reservation is made with the policies (903). The volume retrieval subprogram 300 judges whether the preliminary reservation is made (904) and, if the preliminary reservation is made, stores a preliminary reservation flag, a reservable volume ID, a capacity, a port number, the number of ports, an inputted period of use, a port number, a reliability policy, a performance policy, a security policy, a state, a security group number, and a host name in the volume reservation management table 2300 in step 4 in FIG. 15 using the reservation subprogram 400. When it is necessary to register a security group anew, the volume retrieval subprogram 300 stores the security group in the security group management table 1400 in the storage management DB (905) and ends the processing. When a preliminary reservation is not made, the volume retrieval subprogram 300 ends the processing.

Figure 20:
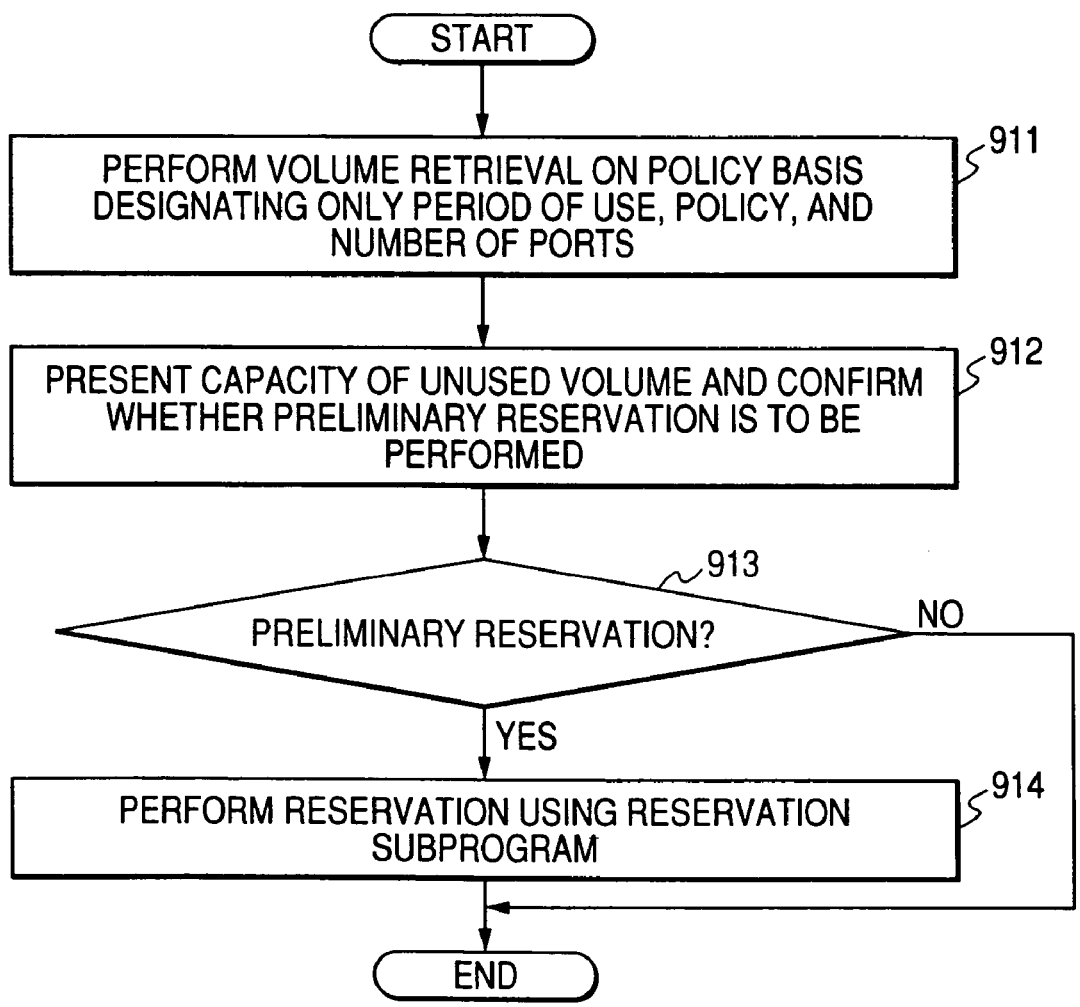
FIG. 20 is a processing flow in the case in which, when a preliminary reservation is made, the preliminary reservation is made by reducing a capacity of a volume to be reserved.

FIG. 20 is a processing flow in the case in which, when a preliminary reservation is made, the preliminary reservation is made by reducing a capacity of a volume to be reserved.

A user designates only a period of use, policies (a performance policy, a reliability policy, and a security policy), and the number of ports to execute the volume retrieval subprogram 300 of a policy basis (911). The volume retrieval subprogram 300 presents a capacity of a volume to the user and confirms whether a preliminary reservation is made with the policies (912). The volume retrieval subprogram 300 judges whether the preliminary reservation is made (913) and, if the preliminary reservation is made, stores a preliminary reservation flag, a reservable volume ID, a capacity, a port number, the number of ports, an inputted period of use, a port number, a reliability policy, a performance policy, a security policy, a state, a security group number, and a host name in the volume reservation management table 2300 in step 4 in FIG. 14 using the reservation subprogram 400. When it is necessary to register a security group anew, the volume retrieval subprogram 300 stores the security group in the security group management table 1400 in the storage management DB (914) and ends the processing. When a preliminary reservation is not made, the volume retrieval subprogram 300 ends the processing.

Figure 21:
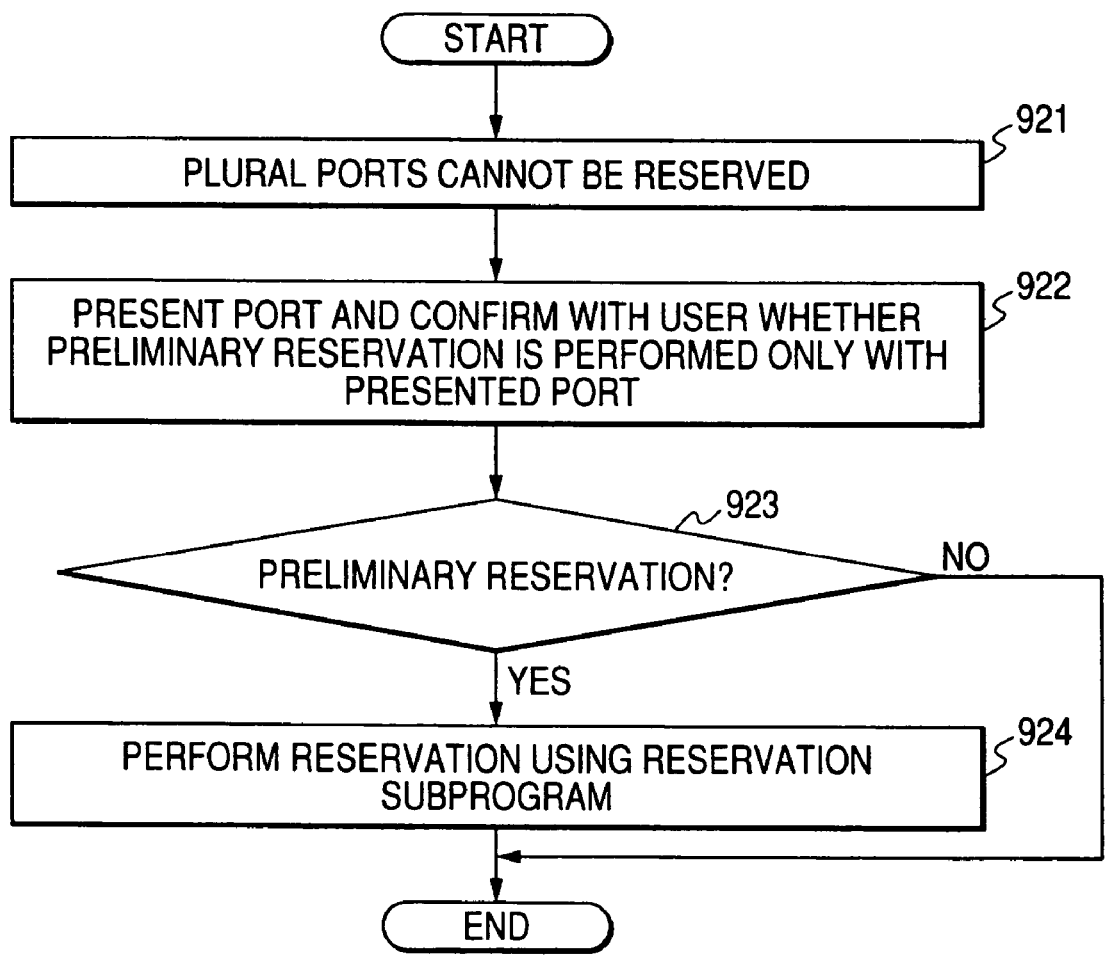
FIG. 21 is a processing flow in the case in which, when it is judged in step 204 in FIG. 8 that a reservation is impossible, a reservation for only a port, which can be reserved, is made as a preliminary reservation.

FIG. 21 is a processing flow in the case in which, when it is judged in step 204 in FIG. 8 that a reservation is impossible, a reservation for only a port, which can be reserved, is made as a preliminary reservation.

When it is judged in step 204 in FIG. 8 that the reservation is impossible (921), the volume retrieval subprogram 300 presents a reservable port to the user and confirms with the user whether at least the presented port is to be reserved (922), and judges whether it is necessary to make a preliminary reservation (923). If necessary, the volume retrieval subprogram 300 stores a preliminary reservation flag, a reservable volume ID, a capacity, a port number, the number of ports, an inputted period of use, a port number, a reliability policy, a performance policy, a security policy, a state, a security group number, and a host name in the volume reservation management table 2300 in step 4 in FIG. 15 using the reservation subprogram 400.

When it is necessary to register a security group anew, the volume retrieval subprogram 300 stores the security group in the security group management table 1400 in the storage management DB (924) and ends the processing. When a preliminary reservation is not made, the volume retrieval subprogram 300 ends the processing.

Figure 22:
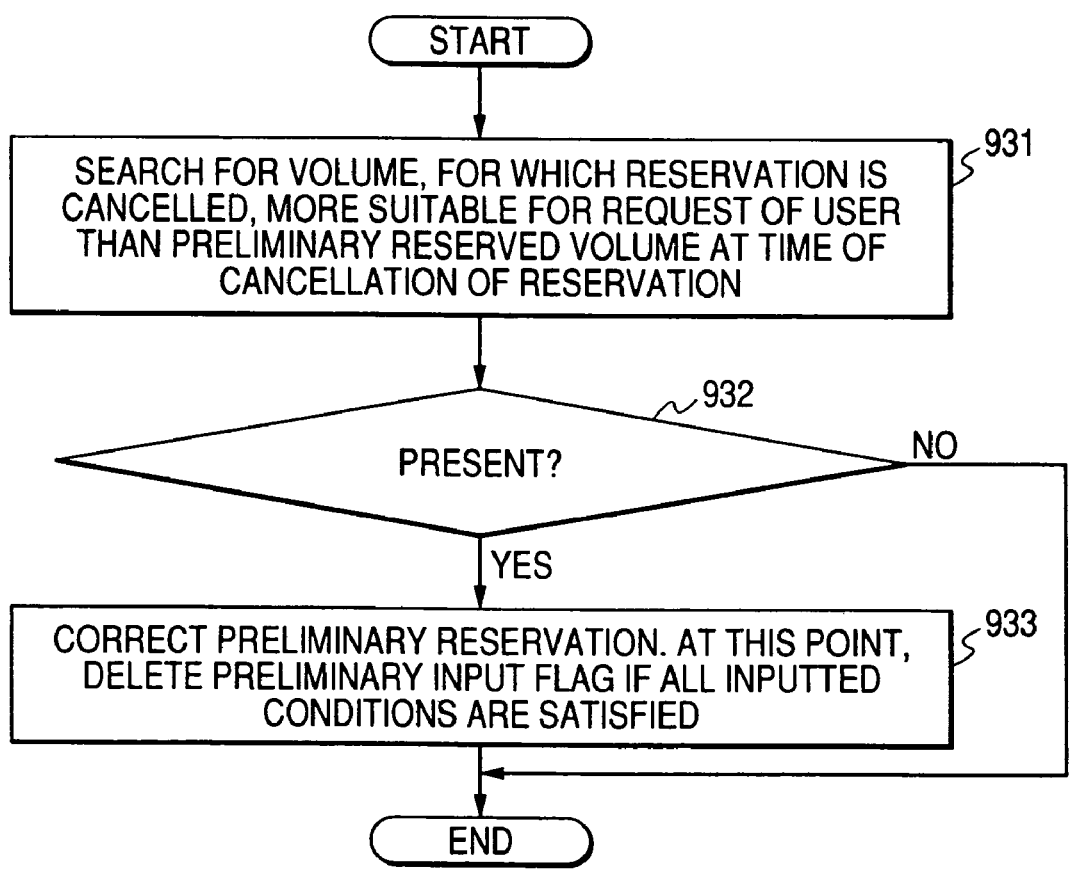
FIG. 22 is a processing flow at the time when a reservation for a volume is cancelled in the case in which a preliminary reservation is possible.

FIG. 22 is a processing flow at the time when a reservation for a volume is cancelled in the case in which a preliminary reservation is possible.

At the time of cancellation of a reservation, concerning all preliminary reservations in the preliminarily reservable volume reservation management table 2300, the reservation management program 200 checks whether a volume, for which a reservation is cancelled, is a volume more suitable for a request of a user than a preliminarily reserved volume (931). The reservation management program 200 judges whether there is a preliminary reservation in which a volume, for which a reservation is cancelled, is a volume more suitable for a request of a user than a preliminarily reserved volume (932) and, if such a preliminary reservation is found, the reservation management program 200 replaces the volume of the preliminary reservation with the cancelled volume. At this point, when the volume is a volume satisfying all the conditions, the reservation management program 200 deletes a "preliminary reservation" flag (933). When a preliminary reservation to be replaced is not found, the reservation management program 200 ends the processing.

Figure 23:
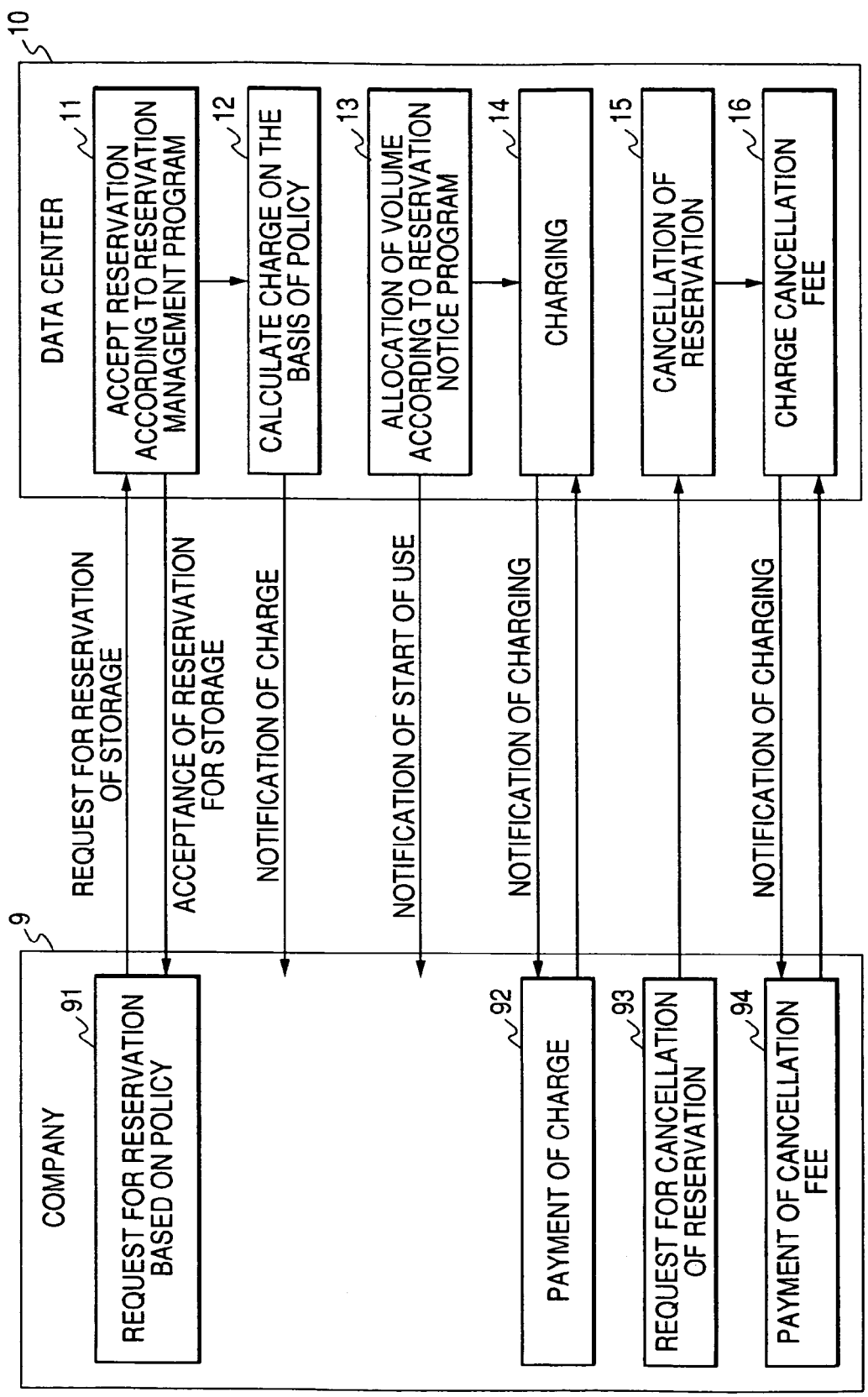
FIG. 23 is a diagram showing an example in the case in which the embodiment of the invention is operated in a data center.

FIG. 23 is a diagram showing an example in the case in which the embodiment of the invention is operated in a data center.

The data center sets a charge for leasing a storage in advance according to levels of required policies.

A company 9 requests a data center 10 to make a reservation for storage based on policies (91). The data center checks whether a reservation is possible using the reservation management program 200 (11). When the reservation is possible, the data center 10 calculates a charge from levels of policies and a capacity (12) and notifies the company 9 of the charge. The data center 10 monitors a date of start of use utilizing the reservation information program, executes allocation of volumes on the date of start of use, and notifies the company 9 of the allocation of volumes (13). At the same time, the data center 10 notifies the company 9 of a request for payment of the charge calculated in advance (14), and the company 9 makes payment of the charge in accordance with the request (92). When the data center 10 receives a request for cancellation of the reservation (93) before the start of use, the data center 10 cancels the reservation (15), charges a several % of the charge calculated in advance as a cancellation fee (16), and the company 9 pays the cancellation fee (94). Since the payment of the cancellation fee is requested on the basis of charge setting of a policy basis, it is possible to prevent the company 9 from requesting the data center to reserve a storage more than necessary.

According to the invention, it is possible to manage a volume and a path, for which plans of use are known in advance, as a reserved volume and a reserved path, and the volume and the path can be reserved in advance more surely. Since states of use of volumes in future can be grasped in advance, it is possible to support a storage apparatus extension project in future.

What is claimed is:

1. A method of managing storage reservation, comprising:
   inputting a reservation for use of a storage from a user;
   judging whether it is possible to reserve a volume and a port of the storage according to the input;
   when it is judged, in the judging step, to be possible to reserve the volume and the port, recording a reservation for the volume and the port in a recording unit, and
   when it is judged, in the judging step, to be impossible to reserve the volume, adjusting the volume judged impossible to reserve, and then judging whether it is possible to reserve the adjusted volume;
   wherein when levels of performance and reliability are designated by the user, a volume and a port satisfying the designated performance and reliability are retrieved, and the retrieved volume and port are reserved;
   the volume and the port retrieved according to the levels of performance and reliability are set to levels equal to or higher than the designated levels of performance and reliability, whereby it is possible to use a volume and a port of levels equal to or higher than the designated levels when a storage has an allowance; and
   when a reservation is received anew and a volume and a port satisfying the designated levels of performance and reliability for the new reservation cannot be detected, it is judged whether it is possible to allocate a prior reservation, which has already been made at levels higher than the designated levels, to another volume and another port within a range of the designated levels and, if it is possible to allocate the prior reservation, changes the prior reservation to the another volume and the another port, and adjusts the volume such that the volume and port previously reserved for the prior reservation can be used for the new reservation.

2. A method of managing storage reservation according to claim 1, wherein
   when the reservation is received anew and the volume and the port satisfying the levels of performance and reliability cannot be detected, it is judged whether it is possible to change allocation of a prior reservation, which has already been made and reserved at levels higher than the designated levels, to another volume and another port within a range of the designated levels and, if it is possible to change the allocation, allocates the another volume and the another port, and adjusts the volume such that the volume and port, which have been allocated for the prior reservation, can be newly allocated for the new reservation.

3. A method of managing storage reservation according claim 1, wherein
when a volume and a port satisfying policies inputted by the user are not found, a volume and a port available in a period of use are registered as a preliminary reservation.

4. A method of managing storage reservation according to claim 3, wherein
when a volume and a port satisfying policies inputted by the user are not found, a volume and a port satisfying conditions of only a capacity and a number of ports in a period of use are registered as a preliminary reservation.

5. A method of managing storage reservation according to claim 3, wherein
when a volume and a port satisfying policies inputted by the user are not found, a volume and a port satisfying conditions of only policies and a number of ports in a period of use are registered as a preliminary reservation.

6. A method of managing storage reservation according to claim 3, wherein
when a volume and a port satisfying policies inputted by the user are not found, a volume and a port satisfying conditions of only policies and a capacity in a period of use are registered as a preliminary reservation.

7. A method of managing storage reservation, comprising:
inputting a reservation for use of a storage from a user;
judging whether it is possible to reserve a volume and a port of the storage according to the input;
when it is judged, in the judging step, to be possible to reserve the volume and the port, recording a reservation for the volume and the port in a recording unit, and
when it is judged in the judging step, to be impossible to reserve the volume, adjusting the volume judged impossible to reserve, and then judging whether it is possible to reserve the adjusted volume;
wherein when levels of performance and reliability are designated by the user, a volume and a port satisfying the designated performance and reliability are retrieved, and the retrieved volume and port are reserved;
when a volume and a port satisfying policies inputted by the user are not found, a volume and a port available in a period of use are registered as a preliminary reservation; and
when other reservations are cancelled, when a volume and a port in the preliminary reservation are closer to policy levels than a cancelled volume and a cancelled port of the cancelled reservations, the cancelled volume and the cancelled port are replaced by the preliminary reserved volume and port.

8. A method of managing storage reservation, comprising:
receiving a reservation for use of a storage from a user;
judging whether a volume and a port of the received storage can be reserved;
when it is judged that the volume and the port can be reserved, recording a reservation for the volume and the port in a recording unit;
when there is no volume in an unused state in the storage, judging whether the volume can be substituted by a volume that is reserved for a prior reservation;
when it is judged that the volume can be substituted by the reserved volume, substituting the volume with the reserved volume;
registering a new reservation in the recording unit;
when there is no reserved volume that can be substituted, judging whether the volume can be substituted by a used volume;
when it is judged that the volume can be substituted by a used volume, rearranging the used volume; and
registering a new reservation in the recording unit.

9. A storage management system, comprising:
plural processing apparatuses that process tasks;
a storage apparatus including plural volumes that are connected to the processing apparatuses via a network and store information to be processed in the processing apparatuses;
a storage management apparatus including a unit that is connected to the processing apparatuses and the storage apparatus and manages the storage; and
a client including a display device that displays related information for management of the storage and an input device that inputs the related information,
wherein the storage management apparatus includes: a unit that manages a reservation for a volume and a port; a storage that stores the reservation; a volume adjusting unit that, when there is no reservable volume and port for an input reservation, judges whether a reservation is possible with a previously reserved or allocated volume; a unit that, when volume adjustment of a previously reserved volume is possible, adjusts the previously reserved volume to be reservable for the input reservation; and a unit that, when volume adjustment of a previously allocated volume is possible, adjusts the previously allocated volume to be allocatable for the input reservation.

10. A storage management system according to claim 9, further comprising a unit that connects with a storage performance management apparatus, which includes a unit that analyzes performance of the storage apparatus and the network and has a storage that stores a result of the analysis, and when a performance policy is inputted as reservation information of a policy basis, inquires of said storage performance management apparatus whether a volume satisfies the performance policy.

* * * * *